(12) United States Patent
Elefsrud

(10) Patent No.: US 6,461,098 B1  
(45) Date of Patent: Oct. 8, 2002

(54) APPARATUS AND METHOD FOR DISPOSAL OF CEMENT WASTE

(76) Inventor: Kevan P. Elefsrud, 617 Richland Rd., San Marcos, CA (US) 92069

(*) Notice: Subject to any disclaimer, the term of this patent is extended or adjusted under 35 U.S.C. 154(b) by 0 days.

(21) Appl. No.: 09/681,000

(22) Filed: Oct. 6, 2000

(51) Int. Cl.$^7$ ............................... B60P 3/16; B28C 5/42
(52) U.S. Cl. .................... 414/618; 414/408; 366/41
(58) Field of Search ................... 414/618, 408; 366/41

(56) References Cited

U.S. PATENT DOCUMENTS

| | | | | |
|---|---|---|---|---|
| 4,722,658 A | * | 2/1988 | Wurtz et al. | 414/408 |
| 5,741,065 A | * | 4/1998 | Bell et al. | 366/41 X |
| 6,039,468 A | * | 3/2000 | Kowaleyzk | 366/41 |

FOREIGN PATENT DOCUMENTS

| | | | |
|---|---|---|---|
| DE | 4209696 | * | 9/1993 |
| JP | 8198003 | * | 8/1996 |

\* cited by examiner

Primary Examiner—Steven A. Bratlie
(74) Attorney, Agent, or Firm—Thomas Fitting

(57) ABSTRACT

Apparatus and method for collecting and transporting cement and concrete waste. The apparatus comprises a container, a cart for supporting and moving the container, and lifting means attached to the frame of a cement truck for lifting the cart and container off the ground for transport. The apparatus may be stored on a cement truck so that the apparatus and method can be used at any job site where the cement truck is present. Use of the disclosed method and apparatus prevents disposal of cement and concrete waste in an unlawful or unsightly manner and allows the cement and concrete waste to be returned to a cement and concrete production facility and recycled.

11 Claims, 5 Drawing Sheets

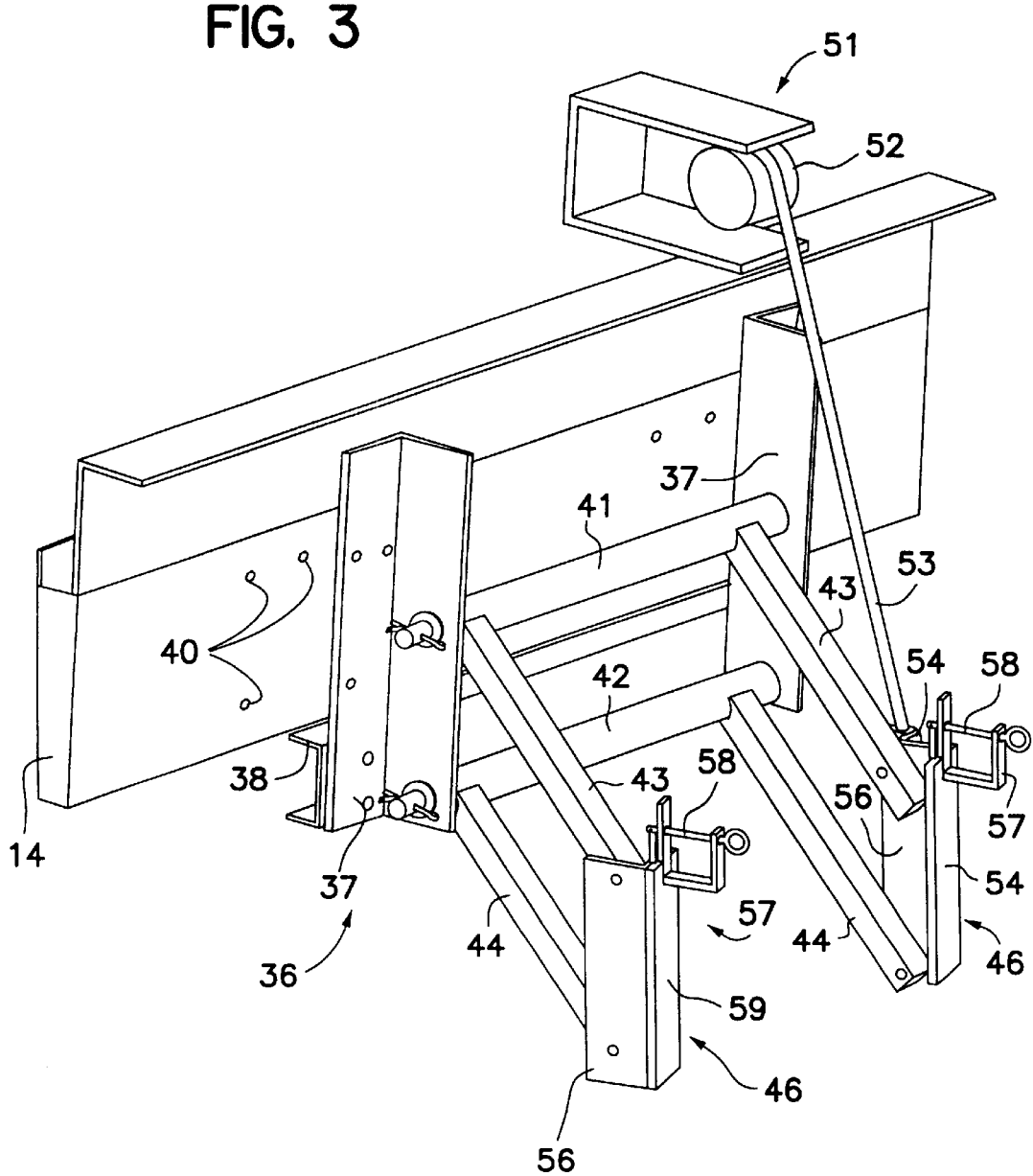

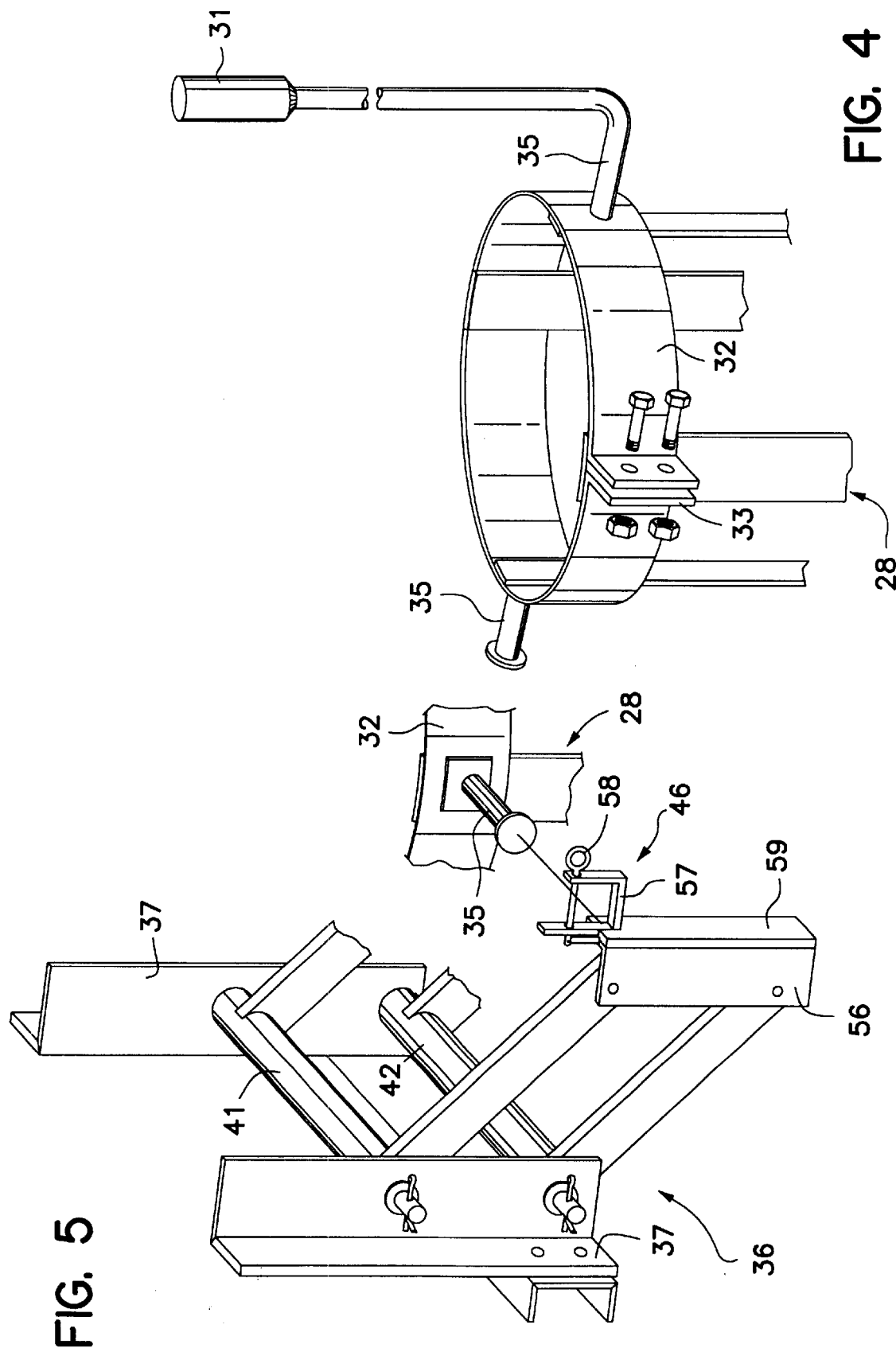

APPARATUS AND METHOD FOR DISPOSAL OF CEMENT WASTE

BACKGROUND OF THE INVENTION

1. Field of the Invention

This invention relates to an apparatus and method for clean up and disposal of cement and concrete waste. The use of the subject apparatus and method facilitates the clean up of cement and concrete waste at a job site. Cement trucks having a cement mixing drum connected to a chute for delivering mixed concrete from the mixer to a particular location are commonly used throughout the country in the construction of buildings, roads and other concrete structures. When the job is finished, the cement within the chute, must be cleaned before the truck leaves the job site. Otherwise, the concrete will harden making it difficult or impossible to clean off the chute. It is common practice to wash the waste from the chute onto the ground, into a wheelbarrow, or into a nearby storm drain. However, such disposal usually violates local laws or ordinances governing the disposal of concrete or cement waste. Nevertheless, this is done regularly, either intentionally or unintentionally, because no other facilities are available at a job site to clean up the concrete waste. This invention protects the environment by keeping cement and concrete and waste from being disposed of into the storm sewers.

2. Description of Related Art

Cummins U.S. Pat. No. 6,033,178 discloses a device that mounts to the rear tail gate of a pick up truck and allows the user to lift the trash container off the ground for transport. Cummins discloses an articulating support frame which is attached to the back of a pick up truck. The frame engages the trash container and lifts it to a raised position for transport by the vehicle.

Mottin U.S. Pat. No. 3,083,849 discloses an apparatus for collecting waste materials including a waste container which is hydraulically lifted and dumped into a truck.

Updik, Jr. U.S. Pat. No. 3,762,586 discloses a refuse collection vehicle and a front loading bin which may be hydraulically raised to dump the refuse therein into the main body of the vehicle.

Hite U.S. Pat. No. 4,596,347 discloses a rear mounted utility box with a dumping pivot for lawn and garden tractor.

Dula U.S. Pat. No. 5,738,261 discloses a vehicle hitch for securing a hand cart.

Kann et al. U.S. Pat. No. 5,599,071 discloses a trash truck which has a front compartment which can be loaded and then raised to dump the contents thereof into the truck.

Szinte U.S. Pat. No. 5,833,428 discloses a refuse receptacle collection assembly which includes a container which can be engaged by a truck and raised so that the contents thereof can be dumped into the truck.

Ramsey et al. U.S. Pat. No. 5,879,015 discloses a trash truck that can pick up a trash container and dump it over the side of the truck into the truck.

None of the foregoing prior art discloses apparatus mounted to a cement truck for clean up and disposal of concrete and cement waste or any method for doing so.

SUMMARY OF THE INVENTION

The present invention fills an environmental need for an apparatus and method for facilitating and enabling the disposal of concrete and cement waste. The present invention provides an apparatus and method that allows the waste in the concrete delivery chute or otherwise on the job site to be removed easily and transported to the cement production facility or some other remote location where it may be recycled.

In one embodiment of this invention, the apparatus includes a container to receive cement and concrete waste. The container is a barrel or other receptacle which may be made of metal, plastic or any other suitable material. The apparatus further includes some facilities for supporting the container, such as a cart which allows the container to be moved easily along the ground. The cart, preferably, has a brake to allow its movement to be slowed or stopped by an operator. The cart includes facilities for securing the container onto the cart.

A lifting assembly is mounted to the frame of a cement mixer truck, preferably between the cab of the truck and the mixer, for lifting the cart and the container mounted thereto off the ground for transport of the cement waste to a remote location, typically the concrete production facility where it can be recycled. The lifting assembly includes an electric or manual winch which can be operated to lift the heavy cart and container off the ground. The electric winch can be powered by the battery of the truck. After the cart is engaged by the lifting assembly, it is secured to the truck so that it can be safely transported. The container is covered by a lid during transport.

An optional agitation or vibrating assembly may also be mounted to agitate the waste in the container to prevent the cement from setting during transport. This may be externally mounted to the container or a vibrating element may be extended into the concrete waste in the container to vibrate it from either the top, bottom or sides of the container.

The subject method of this invention includes positioning a drum or container under the chute of the cement truck so that material collected from washing the chute can be deposited into the container. Waste located in the chute is washed from the chute and collected in the container. Additional waste may also be removed from the job site by hand and deposited into the container. The container is then moved to a position where it can be lifted onto the frame of the cement truck. The container is then lifted onto the cement truck and is secured to allow safe transport of the container to a remote location.

Use of the apparatus and method of this invention avoids depositing cement or concrete waste in locations that may violate laws or ordinances. By storing the container on the cement truck when it is not in use, it insures that a convenient apparatus and method of concrete and cement disposal is always available wherever the cement truck is present. When the cement truck returns to the cement or concrete production facility, the waste may be recycled and used in future cement or concrete production. Alternatively, it may be safely disposed of at the production facility, if desired.

Further aspects of the present invention will become apparent from the following detailed description when considered in conjunction with the accompanying drawings. It should be understood, however, that the detailed description and the specific examples while representing the preferred embodiments are given by way of illustration only.

BRIEF DESCRIPTION OF THE DRAWINGS

FIG. 3 is an enlarged perspective view of one embodiment of a lifting assembly that may be used to lift the cart and container for transport in accordance with the principles of this invention.

FIG. 4 is a perspective view of a portion of the cage assembly.

FIG. 5 is a perspective view of a portion of the lifting assembly.

DETAILED DESCRIPTION OF PREFERRED EMBODIMENTS

The following description is of the best presently contemplated modes of carrying out the inventions. This description is made for the purpose of illustrating the general principles of the invention and should not be taken in a limiting sense.

Figure 1:
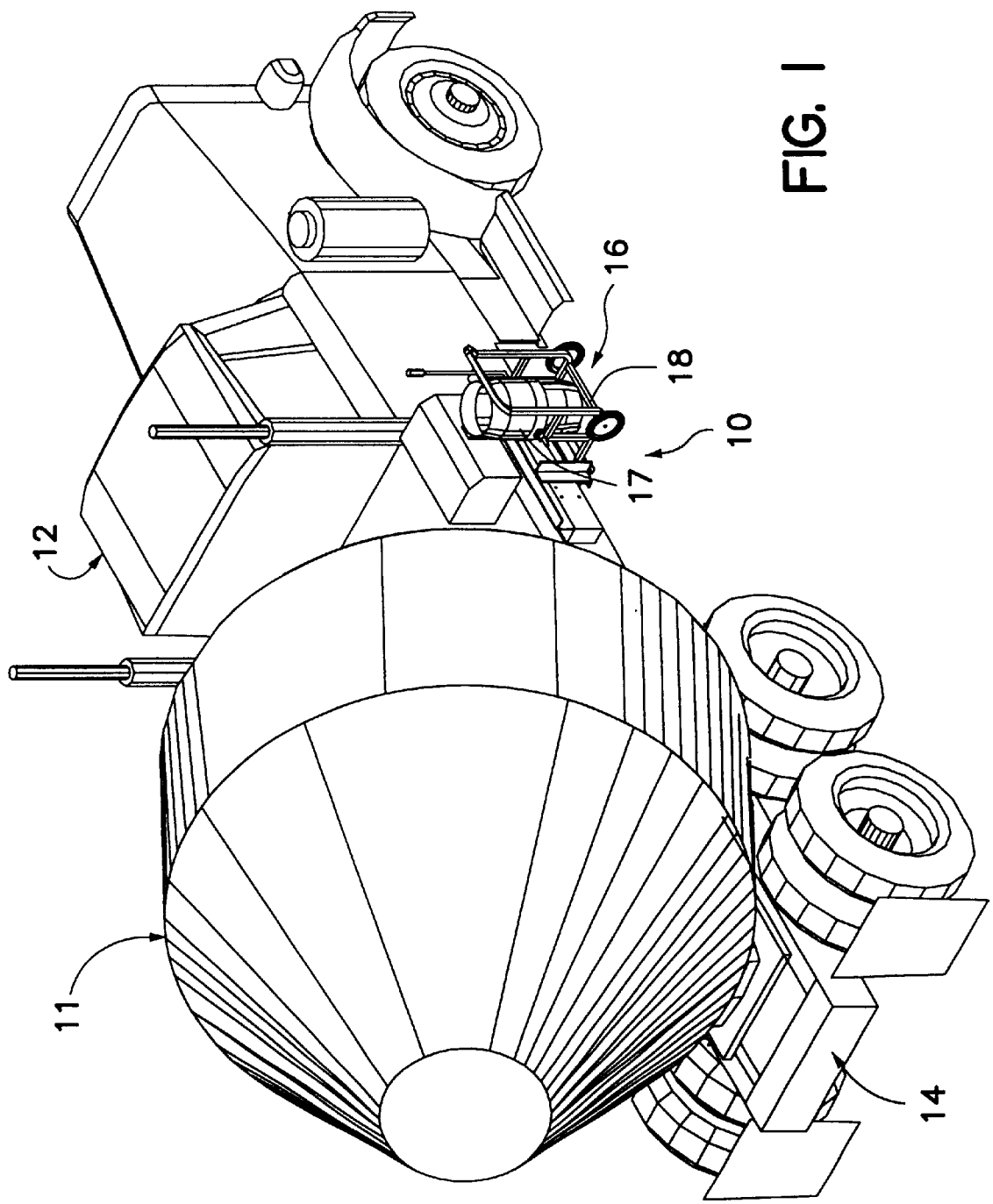
FIG. 1 is a perspective view of a cement truck having apparatus for disposal of cement waste in accordance with the principles of this invention.

In accordance with the present invention, there is shown in FIG. 1 a cement truck generally designated as 10. The cement truck has a mixer 11, a cab 12, and a frame 14. Mounted behind the cab 12, and before the mixer 11 is disposal apparatus generally designated as 16. This apparatus includes a container 17 which is mounted on a cart 18. While the disposal apparatus 16 is shown as being mounted behind the cab 12, which is the most convenient place to do so, it may nevertheless be mounted elsewhere on the frame 14 for transport of the concrete waste to a remote location.

Figure 2:
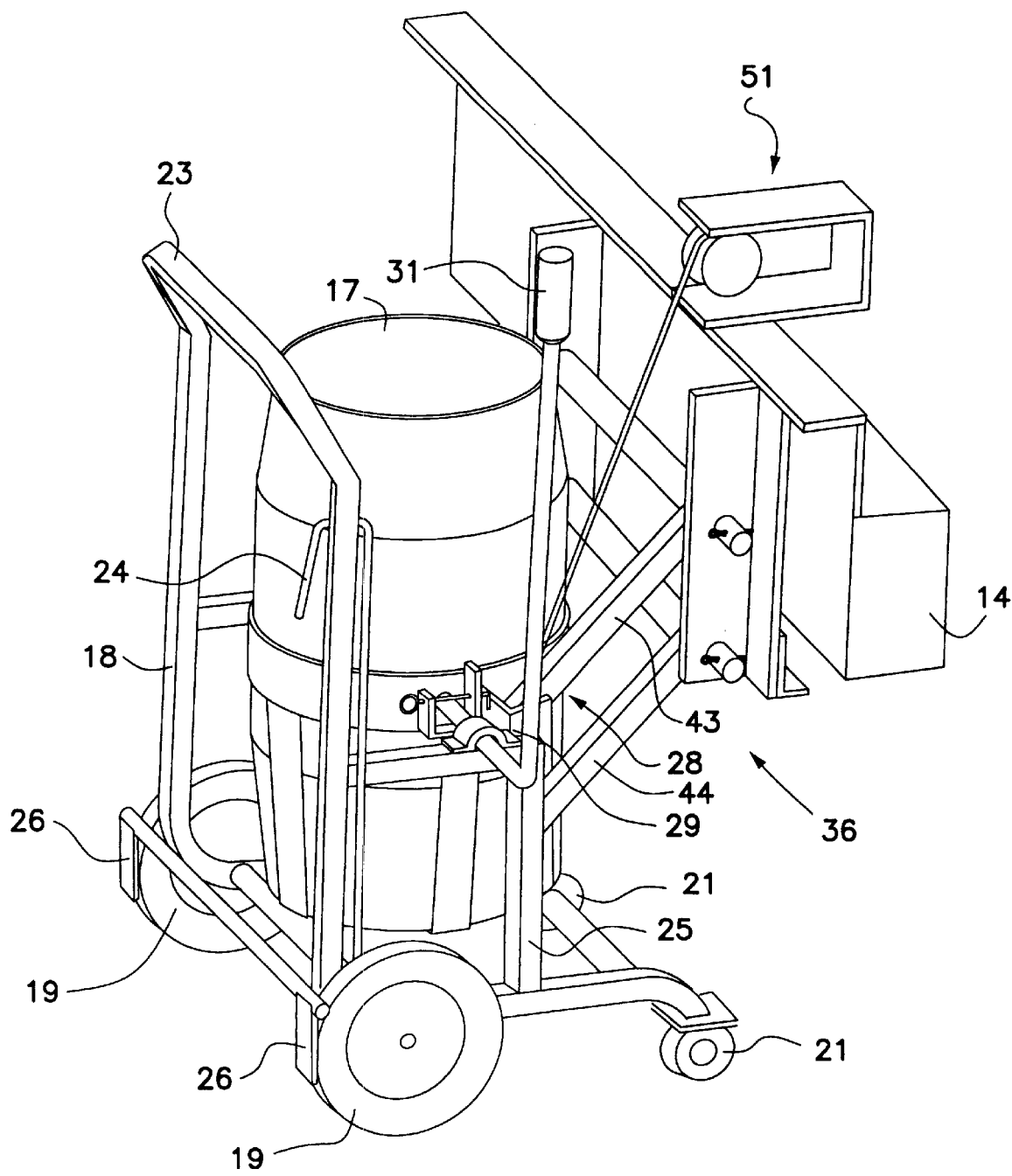
FIG. 2 is a perspective view of the container, cart, cage assembly and lifting assembly, and a portion of the frame of the cement truck.

Referring to FIG. 2, the container 17 is shown mounted on the cart 18. The cart 18 includes a pair of rear wheels 19 and a pair of front wheels or casters 21. The wheels are either the same or different sizes if desired. The use of the large wheels 19 and the smaller casters 21 allow the cart to be rolled flat or tilted back like a hand truck. The wheels 21 are preferably casters so they allow the cart to be rotated easily if desired for positioning the cart both beneath the chute (not shown) of the cement truck, or positioning it near the lifting assembly identified generally as 36, which is mounted to the truck frame 14 as described more fully hereinafter. The cart 18 includes a handle 23 and a frame 25. The cart 18 also includes a parking brake 24 which when pulled moves a pair of plates 26 against each wheel 19 to slow or prevent the wheels from rotating.

The container 17 is supported by a cage assembly 28 which is rotatably mounted to the frame 25 of the cart 18. The frame 25 has a pair of pillow blocks 29 mounted thereto for receiving a pair of shafts 35 connected to the cage assembly 28 which is shown in FIG. 4. The cage assembly 28 has a top band 32 to which shafts 35 are welded on opposite sides. The top band 32 may be separable at 33 to allow easy insertion of container 17. A handle 31 is mounted to one shaft 35 of the cage assembly 28 to allow the container 17 to be tilted to either allow the contents of the container 17 to be dumped or to align the container 17 with the chute so that material can be washed out of the chute into the container relatively easily. The handle 31 can be moved forward or backwards while the cart is on the ground to tilt the container in either direction for dumping. When the cart 17 is loaded on the truck, the cart can be tilted backwards for dumping without it being disengaged from the truck. Preferably the container 17 is a thirty gallon polyethylene container. It may also be made of metal or other plastic materials. The cage assembly 28 is preferably made of stainless steel. The cage can be rotated relative to the cart 18 by moving the handle 31 either forward or backward.

Referring now to both FIGS. 2 and 3, the lifting assembly generally designated as 36 is shown mounted to the frame 14 of the truck 10. The lifting assembly 36 is mounted to truck frame 14 using existing bolt hole patterns such as those shown at 40. If bolt holes do not exist, holes may be drilled in the frame 14 to allow the lifting assembly 36 to be mounted thereto. Alternatively, the lifting assembly could be welded to the frame or fastened by some by other means well known in the art.

The lifting assembly 36 includes a pair of angle members 37 interconnected by a U shaped member 38 which extends from one angle member 37 to the other angle member 37. A pair of cross bars 41 and 42 are mounted to the angle members 37 for rotary movement relative thereto. The members 41 and 42 are connected to a pair of lifting arms 43 and 44 on each side of the lifting assembly 36. At the end of each pair of lifting arms 43 and 44 there is an engaging assembly generally designated as 46. The engaging assembly 46 will be explained more fully hereinafter.

The lifting assembly 36 engages the shafts 35 of the cage assembly 28 holding the container 17 to lift the entire container 17, cage assembly 28 and cart assembly 18 onto the truck 10. Lifting can be accomplished either by an electric winch or a manual winch which mounted to the truck 10 and is generally designated as 51. The winch 51 has a drum 52 on which is mounted a cable 53 which has one end connected at 54 to an arm 43 of the lifting assembly 36. When the winch 51 is actuated, the pair of arms 43 and 44 rotate upwardly to lift the cart and container off the ground. A rubber sealed lid, not shown, is preferably attached and locked onto the container to keep all waste in the container during transport.

Referring now to FIGS. 3 and 5, the engaging assembly 46 includes a vertical support 56 against which the vertical frame of the cart 18 is held during transport. If desired a rubber pad 59 may be bonded to support 56 to protect the cart frame 25. A pair of U shaped members generally designated as 57 each have a quick release hitch or locking pin 58 which locks each shaft 35 of the cage assembly 28 when the lifting assembly 36 engages the cage assembly.

Figure 6C:
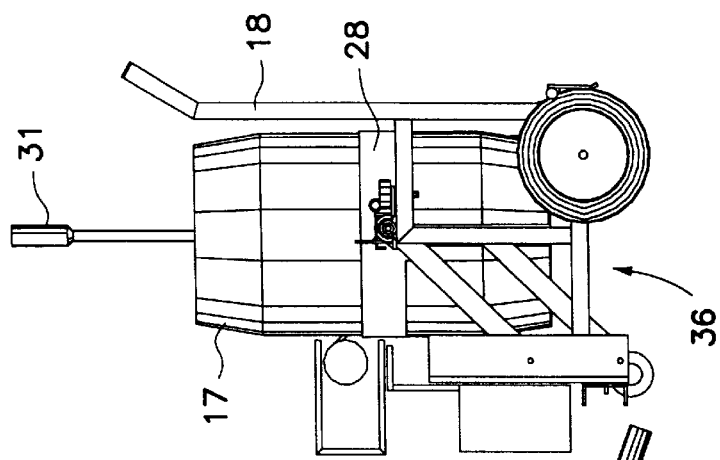
FIG. 6 illustrates the apparatus of this invention in three different positions.
Figure 6B:
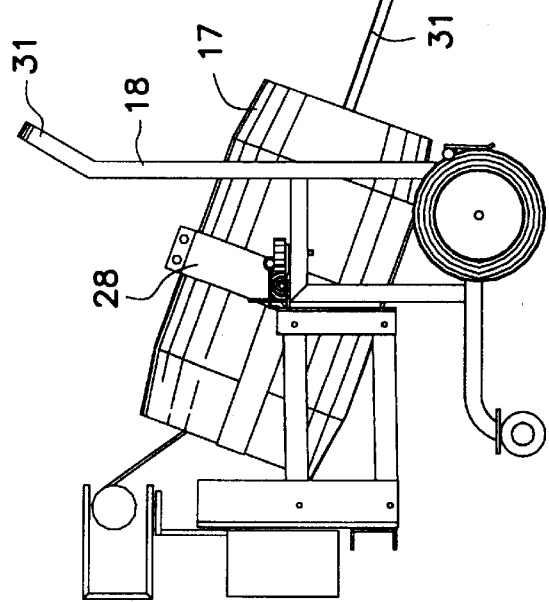
Figure 6A:
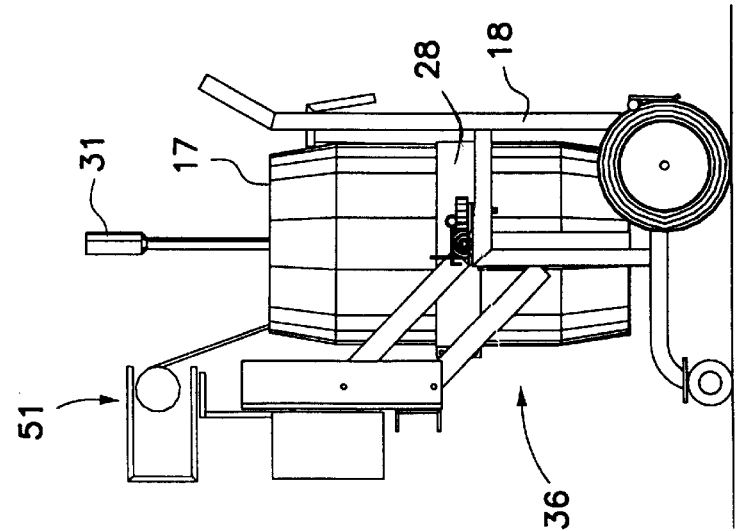

Referring now to FIG. 6A there is shown the container 17 on cart 18 which is resting on the ground prior to being lifted onto the truck. The lifting assembly 36 is shown in engagement with the cage assembly 28. FIG. 6C the lifting assembly 36 is shown in the fully raised position in which the cart 18 is transported on the truck. FIG. 6B shows the lifting assembly 36 in an intermediate position where the cart 18 is partially lowered to allow waste to be dumped from the container 17 while on the truck.

The container 17 may be agitated during transport in a number of different ways. An agitator or shaker may be mounted to the cage to agitate the cage during transit. The agitator may be electrically operated and powered by the battery. Alternatively, a rod may be placed into the container either from the bottom, top or the sides of the container, and the rod may be agitated or vibrated during transit to prevent the waste in the container from setting.

In use at the job site, the lifting assembly 36 is lowered and the cart 18 and container 17 are disengaged from the engaging assembly 46. The cart 18 is rolled to the end of the truck where the chute can be placed into or above the entrance into the container 17. The chute is then washed out into the container 17. Any other waste lying around the job site can be deposited by hand into the container. The cart 18 is then rolled over to the lifting assembly 36 where the engaging assembly 46 is positioned such that the U shaped members 57 engage the shafts 35 of the cage assembly 28. The locking pins 58 are inserted in place to secure the cage assembly 28 to the lifting assembly 36. The winch 51 is actuated to pull the arms 43 and 44 up to raise the cart 18 and container 17 off the ground. The winch pulls the entire assembly tight against the truck frame where it remains for transport. Safety chains or lanyards may further secure the apparatus for transport. At the cement production facility, the winch is reversed to lower the cart 18 to the ground or to the position shown in FIG. 6B to allow waste to be dumped while the apparatus is on the truck. When the apparatus is lowered to the position shown in FIG. 6A, the locking pins 58 are released to allow the engaging assembly 46 to disengage from the shafts 35 of the cage assembly. The cart 18 can then be wheeled to wherever the cement and concrete waste is to be disposed of.

Although the present invention has been described in terms of certain preferred embodiments and exemplified with respect thereto, one skilled in the art will readily appreciate the various modification, changes, omissions, and substitutions may be made without departing from the spirit and scope of the present invention. It is intended that the present invention be limited soley by the scope of the following claims:

What is claimed is:

1. An apparatus for the collection and transportation of cement waste comprising:

a container to receive cement waste;

cart means for supporting and moving the container; and means mounted to the frame of a cement mixer truck between the cab of the truck and the mixer for lifting the cart means and container off the ground for transport of the cement waste.

2. Apparatus as set forth in claim 1 wherein said cart means comprises:

cage means rotatably mounted to the cart means for holding the container and allowing the container to tilt relative to the cart means.

3. The apparatus as set forth in claim 2 wherein said cage means comprises at least one band encircling said container with a pair of shafts extending from opposite sides of said band.

4. The apparatus as set forth in claim 3 wherein said cart means comprises means for rotatably receiving said shafts of said cage means.

5. The apparatus as set forth in claim 4 wherein said cart means further comprises means for rotating the container forward and backward about the axis of said shafts.

6. The apparatus as set forth in claim 3 wherein said means for lifting comprises a pair of arms each having a first end for engaging the pair of shafts and a second end rotatably movable relative to the truck frame.

7. The apparatus as set forth in claim 6 wherein said means for lifting further comprises winch means including a cable having a free end of said cable attached to the first end of one of the said arms.

8. The apparatus as set forth in claim 1 further comprising means for agitating the cement waste in the container during transport.

9. An apparatus for the collection and transportation of cement and concrete waste comprising:

a container to receive cement and concrete waste;

means for supporting the container; and means adapted to be mounted to the frame of a cement truck between the cab of the truck and the mixing drum for lifting said means for supporting the container and said container off the ground for transport to a remote location for disposal of the waste.

10. An apparatus as set forth in claim 9 wherein said means for supporting the container comprises a cart and means for rotating said container relative to said cart.

11. A method of collecting and disposing of cement waste comprising:

positioning a container under a chute of a cement truck;

washing down the chute so that waste located in the chute is deposited in the container;

moving the container to a position alongside the truck where it can be lifted onto the truck;

lifting the container off the ground so that it can be transported; and transporting the container to a remote location for disposal of the waste.

* * * * *